United States Patent [19]

Walker et al.

[11] 4,220,078
[45] Sep. 2, 1980

[54] PAINT-SPRAYING BOOTH APPARATUS

[75] Inventors: Reginald J. Walker, Solihull; David T. Geen, Hockley Heath, both of England

[73] Assignee: Otto Durr (Great Britain) Limited, Leamington Spa, England

[21] Appl. No.: 882,440

[22] Filed: Mar. 1, 1978

[30] Foreign Application Priority Data

Mar. 2, 1977 [GB] United Kingdom ............... 8799/77
Oct. 18, 1977 [DE] Fed. Rep. of Germany ....... 2746738

[51] Int. Cl.³ ............................................. B01D 47/00
[52] U.S. Cl. .................. 98/115 SB; 55/240
[58] Field of Search ................ 98/115 R, 115 SB; 55/240, 241

[56] References Cited

U.S. PATENT DOCUMENTS

| 3,112,352 | 11/1963 | Krantz | 55/241 X |
| 3,138,087 | 6/1964 | Larsson et al. | 98/115 SB |
| 3,168,031 | 2/1965 | Wilhelmsson et al. | 98/115 SB |
| 3,656,279 | 4/1972 | McIlvaine et al. | 55/240 |
| 4,045,524 | 8/1977 | Bornery | 98/115 JB X |

FOREIGN PATENT DOCUMENTS 1218401 1/1971 United Kingdom .

Primary Examiner—Albert J. Makay
Assistant Examiner—Harold Joyce
Attorney, Agent, or Firm—Anthony J. Casella

[57] ABSTRACT

A paint-spraying booth apparatus includes a floor over which objects e.g. motor vehicle bodies to be spray painted pass, the floor being permeable to air, a reservoir beneath the floor containing water, conduits extending downwardly from the reservoir, the reservoir and the conduits being arranged so that paint-containing air passing through the floor mixes with water from the reservoir, the resulting mixture passing through the conduits. An impingement member is spaced from the outlet of each conduit and disposed so that the mixture flowing through the conduit impinges thereon. A guard member surrounds each conduit and the respective impingement member to urge said mixture, after contact with the latter, to travel substantially downwardly. A first collecting chamber is arranged to collect a water/paint component of said mixture beneath the guards and second collecting chamber is arranged to collect a substantially paint-free air component of the mixture.

8 Claims, 1 Drawing Figure

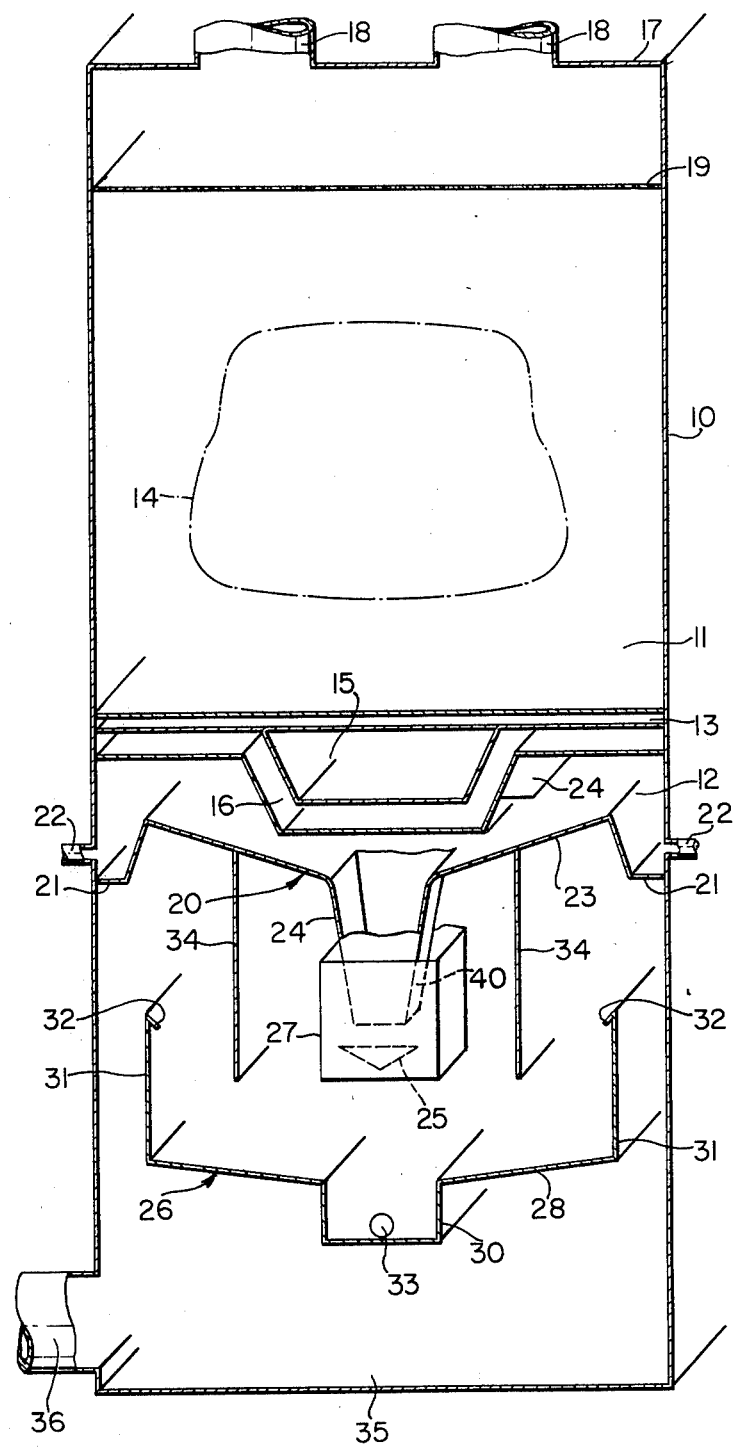

PAINT-SPRAYING BOOTH APPARATUS

This invention relates to paint-spraying booth apparatus.

According to the present invention there is provided a paint-spraying booth apparatus including: a floor over which, in operation, objects to be spray painted pass, said floor being permeable to air; reservoir means beneath the floor for containing water; a plurality of conduits which converge from inlet to outlet and which extend downwardly from the reservoir means, the reservoir means and the conduits being arranged so that paint-containing air passing through the floor mixes with the water from the reservoir means, the resulting mixture passing through the conduits; impingement means spaced from the outlet of each conduit and disposed so that said mixture flowing through the conduit means impinges thereon to perform a first scrubbing action; guard means surrounding each conduit and respective impingement means to urge said mixture, after contact with the impingement means, (a) to impinge on the respective guard means to perform a second scrubbing action and (b) to travel substantially downwardly, each conduit means and the respective guard means defining therebetween an open-ended pasageway debouching adjacent the respective impingment means; first collecting means for collecting a water/paint component of said mixture beneath the guard means; and second collecting means for collecting a substantially paint-free air component of the mixture.

In the preferred embodiment each impingement means is V-shaped.

Each impingement means may be disposed so that a pool of said mixture forms therein.

In the preferred embodiment, the second collecting means, includes a chamber for collecting said air component, said chamber being disposed beneath the first collecting means.

The apparatus may include a tortuous flow path for said air component between said conduits and the said chamber, to remove substantially all paint and/or water particles entrained in said air component. Said tortuous flow path may include upwardly extending baffle means on the first collecting means and downwardly extending baffle means on the reservoir means.

Said reservoir means in the preferred embodiment includes channel means connected to receive a supply of water and a surface sloping downwardly therefrom toward the conduits.

Said first collecting means may include a floor sloping downwardly towards a collecting trough disposed beneath the conduits.

The apparatus may include adjusting means for adjusting the distance between the or each impingement means and the outlet of the respective conduit.

The invention is illustrated, merely by way of example, in the accompanying drawing which is a schematic end view of a paint-spraying booth apparatus according to the present invention.

The apparatus illustrated in the drawing comprises a longitudinally extending tunnel 10 which is divided into two chambers, 11, 12 by a floor 13 which is permeable to air. Objects to be spray painted, for example motor vehicle bodies 14, are conveyed through the chamber 11 of the channel 10 by conveying equipment (not shown) disposed in a well 15 formed in a subfloor 16 beneath the floor 13, the floor 16 also being permeable to air. Manually operable and/or automatic paint spraying equipment (not shown) is located along the sides of the tunnel 10 so that the vehicle bodies 14 are spray painted as they are conveyed through the tunnel by the conveying equipment. The tunnel 10 has a roof 17 in which there are a plurality (two shown) of air inlets 18 beneath which is an air filter 19. Air entering the chamber 11, through the inlets 18 passes around the vehicle bodies 14 and through the floor 13 picking up as it passes through the chamber 11 paint particles and vapour which could otherwise represent a health hazard to personnel within the tunnel 10. Thus paint-containing air passes through the floor 13 and through the sub-floor 16.

Beneath the sub-floor 16 and the chamber 12 is a reservoir 20 which is co-extensive with the floor 13. The reservoir 20 has side channels 21 which receive water from respective water inlets 22. The reservoir 20 has a downwardly sloping floor 23 extending from the channels 21 to centrally disposed conduits 24 only one of which is shown in the drawing. The conduits 24 are equally spaced apart along the length of the tunnel 10 and each may be, for example, of rectangular or circular cross-section. As will be seen from the drawing, each conduit 24 converges in the downward direction. In operation, water fed to the channels 21 over-flows therefrom and flows over the floor 23 into the conduits 24. Thus paint-containing air passing through the floor 13 and the sub-floor 16 mixes with the water flowing over the floor 23.

Beneath each conduit 24, there is an impingement member 25 which is spaced from the outlet thereof. In the preferred embodiment, each impingement member 25 is V-shaped so that a pool of a water/paint component of the mixture flowing through the respective conduit 24 forms therein. Thus the mixture passing through the conduit 24 impinges upon the impingement members 25 and a part of the water/paint component will be trapped therein and will overflow and fall downwardly to a water/paint component collecting device 26. The part of the water/paint component not trapped by each impingement member 25 attempts to rebound therefrom in an outward direction, that is to say towards the walls of the tunnel 10. However, a baffle, or guard member 27 which completely surrounds each conduit 24 and the respective impingement member 25 directs the part of the water/paint component which has rebounded from the impingement member downwardly towards the collecting device 26. Thus the mixture passing through each conduit 24 is scrubbed upon contact with respective impingement member 25 and then scrubbed again upon contact with the respective guard member 27. Each conduit 24 and the respective guard member 27 define an open-ended passageway 40 debouching adjacent the respective impingement member.

The collecting device 26 comprises a floor 28 sloping downwardly towards the central trough 30 which extends along the length of the tunnel 10 beneath the guard members 27. Extending upwardly from the sides of the floor 28 are baffles 31 which also extend along the length of the tunnel 10. Each baffle 31 has in inturned flange 32 at its upper end. At one end of the trough 30 is an outlet 33 through which flows the water strip paint component for disposal or separation exterior of the apparatus.

Extending downwardly, from the floor 23 of the reservoir 20 are baffles 34, the lower ends of which are disposed between the baffles 31. Like the baffles 31, the baffles 34 extend over the whole length of the tunnel 10. The baffles 31, 34 together with the impingement members 25 and the guide members 27 form a tortuous flow path for an air component of the mixture as it passes from the conduits 24 around the collecting device 26 to a chamber 35 beneath the latter. During their passage through the tortuous flow path, any particles of paint and/or water entrined in the component tend to strike against the baffles 31,34 and then fall downwardly into the collecting device 26 so that substantially paint-free air enters the chamber 35 and is exhausted to atmosphere through a conduit 36 by means of a fan (not shown) either externally or internally of the apparatus. It has been found that the quantity of the water/paint component collecting in the chamber 35 is substantially negligible compared to the amount collected in the collecting device 26 and is relatively small compared to the amount which would collect if the guard members 27 were not provided.

The distance between the outlet of each conduit 24 and the respective impingement member 25 may be adjustable by means (not shown) to achieve optimum scrubbing of the mixture flowing through the conduits 24. Whilst the impingement members 25 are preferably of the shape illustrated they may be of other shapes, for example, planar, arcuate and of inverted-V-shape. In the illustrated apparatus the conduits 24 extend centrally and along the length of the tunnel 10. However, conduits 24, may in addition be provided across the width of the tunnel 10.

In a typical paint-spraying booth apparatus according to the present invention, the tunnel 10 is between 100 and 200 feet long and 17 feet wide. If the tunnel 10 is 100 feet long, air will normally enter the chamber 11 through the roof 17 at the rate of 200,000 cubic feet per minute. The air inlets 18 being evenly distributed over the entire roof. If the distance between adjacent conduits 24 is three feet, then the amount of air passing through each conduit will be 6,000 cubic feet per minute. In this typical apparatus water is supplied to the channels 21 at the rate of 2,000 gallons per minute so that approximately 66 gallons flows through each conduit each minute.

What is claimed is:

1. A paint-spraying booth apparatus including: a floor on which, in operation, objects to be spray painted pass, said floor being permeable to air; reservoir means beneath the floor for containing water; a plurality of conduits which converge from inlet to outlet and which extend downwardly from the reservoir means, the reservoir means and the conduits being arranged so that paint-containing air passing through the floor mixes with water from the reservoir means, the resulting mixture passing through the conduit means; impingement means spaced from the outlet of each conduit and disposed so that said mixture flowing through the conduit impinges thereon to perform a first scrubbing action; tubular guard means externally surrounding each conduit and the respective impingement means, to urge said mixture, after contact with the impingment means, (a) to impinge on the respective guard means to perform a second scrubbing action and (b) to travel substantially downwardly, each conduit means and the respective guard means defining therebetween an open-ended passageway debouching adjacent the respective impingement means; first collecting means for collecting a water/paint component of said mixture beneath the guard means; and second collecting means for collecting a substantially paint-free air component of the mixture.

2. An apparatus as claimed in claim 1 in which the second collecting means includes a chamber for collecting said air component, said chamber being disposed beneath the first collecting means.

3. An apparatus as claimed in claim 2 including a tortuous flow path for said air component between said conduits and the said chamber, to remove substantially all paint and/or water particles entrained in said air component.

4. An apparatus as claimed in claim 3 in which said tortuous flow path includes upwardly extending baffle means on the first collecting means and downwardly extending baffle means on the reservoir means.

5. An apparatus as claimed in claim 1 in which said reservoir means includes channel means connected to receive a supply of water and a surface sloping downwardly therefrom towards the conduits.

6. An apparatus as claimed in claim 1 in which said first collecting means including a floor sloping downwardly towards a collecting trough disposed beneath the conduits.

7. An apparatus as claimed in claim 1 in which each impingement means is V-shaped.

8. An apparatus as claimed in claim 1 in which each impingment means is disposed so that a pool of said mixture forms therein.

* * * * *